April 9, 1957   HANS-RUDOLF JACOBI ET AL   2,788,196
ENDLESS SCREW CONVEYORS
Filed Nov. 21, 1952                        11 Sheets-Sheet 1

INVENTORS:
HANS-RUDOLF JACOBI
HANS BECK

April 9, 1957  HANS-RUDOLF JACOBI ET AL  2,788,196
ENDLESS SCREW CONVEYORS
Filed Nov. 21, 1952

INVENTORS:
HANS-RUDOLF JACOBI
HANS BECK

April 9, 1957   HANS-RUDOLF JACOBI ET AL   2,788,196
ENDLESS SCREW CONVEYORS
Filed Nov. 21, 1952   11 Sheets-Sheet 6

INVENTORS:
HANS-RUDOLF JACOBI
HANS BECK
BY
Spencer, Johnston, Cook & Root
ATT'YS

United States Patent Office 2,788,196
Patented Apr. 9, 1957

2,788,196
ENDLESS SCREW CONVEYORS

Hans-Rudolf Jacobi, Mannheim-Feudenheim, and Hans Beck, Ludwigshafen (Rhine), Germany, assignors to Badische Anilin- & Soda-Fabrik Aktiengesellschaft, Ludwigshafen (Rhine), Germany Application November 21, 1952, Serial No. 321,762

Claims priority, application Germany November 21, 1951

17 Claims. (Cl. 259—6)

This invention relates to improvements in endless screw conveyors and machines and more particularly to conveyors and machines embodying multiple endless screws or worms wherein a varied speed of rotation is imparted to the multiple endless screws.

Multiple endless screw conveyors as heretofore known have a common feature in that the speed of rotation of all the endless screws is equal. A uniform conveying and kneading action is obtained with such conveyors. It is also known that the kneading action of a single endless screw can be increased by rotating the screw rhythmically backwards and forwards relative to its housing whereby teeth or bosses provided within the housing engage the spaces between the threads of the endless screw. In the case of multiple endless screws, however, such variant movement cannot be employed.

According to one form of the invention an endless screw machine is provided employing multiple screws, one endless screw being driven and imparting to the remaining endless screws a periodically varying speed of rotation. In another form of the invention an endless screw is driven while a housing associated with the screw and provided internally with an endless screw thread rotates with a periodically varying speed.

In still another form of the invention one or more endless screws associated with a housing that may or may not carry a reciprocal thread corresponding to the thread of the screws are provided with a left-hand thread and a right-hand thread. The effect of rotation of such a screw is to convey or knead in a direction determined by the thread and the directional rotation of the screw carrying the thread. The performance of such a machine varies, of course, with the number of screws employed and the arrangement of the endless screws will be determined by the purpose to be accomplished, viz. kneading, kneading and conveying, mixing and conveying, spraying and the like.

The irregular movement of an endless screw, multiple screws with the screw systems and machines herein described, including a rotating housing that may or may not include an internal thread to reciprocate in the mixing, kneading and/or conveying activity of the screws, provides helpful equipment and techniques of general use in manufacturing, farming, and industrial activities. The irregular movement enhances thoroughness of mixing operations, since a slow rotation followed by rapid rotation, increasing and decreasing in speed, prevents sticking of materials being mixed or delivered and material accumulations that frequently occur in kneading and other mixing operations conducted at a uniform pace.

General and varied use of machines employing the principles here described will also have application where it is desirable to have quantities of substances delivered in varying amounts as is required in many manufacturing operations such as milling, compounding and spraying. Characteristic of the form of the machine taught herein is a multiple or simple endless screw machine delivering spray materials at a varying force corresponding to the varied rotation of the screw or screws.

In all cases the endless screw threads of an individual endless screw, multiple screws or of an endless screw associated with a housing having an internal thread, carry out positively coupled rhythmic relative displacements in axial direction without either the endless screws or the endless screw and housing undergoing any longitudinal displacement.

It is an object of the invention to provide an endless screw machine employing multiple endless screws wherein one or more of the screws rotate at a varying speed.

It is another object of the invention to provide an endless screw machine employing a multiple crank mechanism, or a gear arrangement wherein the shape of the gears defines such congruent curves of revolution as may be desired. In keeping with this object eccentrically mounted gears coupled to the endless screws may be employed.

It is another object of the invention to provide a screw machine employing multiple endless screws and a gear arrangement whereby the direction of rotation of the screws may be varied.

Another object of the invention embodies a multiple endless screw machine wherein the screws have a thread arrangement that is left-hand or right-hand disposed on either end of the screws.

A further object of the invention is to provide a single endless screw machine wherein the housing associated with an endless screw rotates at a constant speed and an endless screw rotates at variant speed or the reverse situation wherein the speed of the housing is variant.

Another object of the invention is to provide a machine wherein the driving members associated with endless screws employed in the machine are capable of being determined mathematically.

Another object of the invention is to provide an endless screw machine employing multiple endless screws wherein materials fed into the machine for kneading for conveying purposes are released from the machine by a positive thrust imparted by the endless screws at a point between the extreme ends of the screws.

Other objects of the invention will be apparent from the following description in conjunction with the accompanying drawings wherein.

The periodic alteration in the speed of rotation of the endless screws, and/or the housing, of the machines that comprise this invention is effected by means of a periodic driving gear. Such gear system may be that of a rotating multiple crank mechanism or it may be comprised of eccentrically mounted non-circular gears that are coupled with the endless screws. The shape of the gears can be elliptical or in general may be bounded by any congruent curves of revolution that may be desired.

In general, since the multiple endless screws used in the machines constituting this invention, or the combination of a housing and endless screw, are associated with an elliptical gear driving arrangement, the nature of the rotation of the threads of the housing and screws is a direct result of the gear relationship. The gears being non-circular, the relationship of the gears to the endless threads is such that it is possible to obtain a variable motion of the screw thread or housing. If one gear intermeshed with other non-circular gears is driven there will be a variant speed of rotation of the gears. The power driven gear will engage only a small portion of the circumference of one of the gears with which it is associated during a given time interval and will engage with a larger portion of the gear or gears with which it is associated at another point. In the one instance, the consequent rotary action imparted to the screws will be rapid and in the other instance it will be slow. The variant speed of rotation of the gears will be transmitted to the endless screws since the latter generally are mounted in the same axial plane as the gears.

The conditions for the interrelationship of the various multiple screw systems prescribed can be described mathematically and such description of each system will be given. Though the suggested crank mechanism can be used for empowering the variant rotation of the endless screw systems, the conditions for interrelationship can best be seen in terms of elliptical gears employed as driving members wherein in each system one gear is preferably driven at a constant rotational speed.

The following examples given with reference to the accompanying drawings illustrate the various systems that can be employed, and machines and equipment wherein the systems may be employed.

EXAMPLE I

Triple endless screw system

Figure 1A:
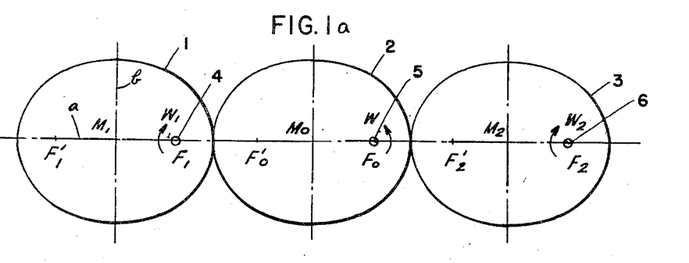
Figure 1(a) is a diagrammatic illustration of elliptical gears employed in one form of the endless screw machine.
Figure 1B:
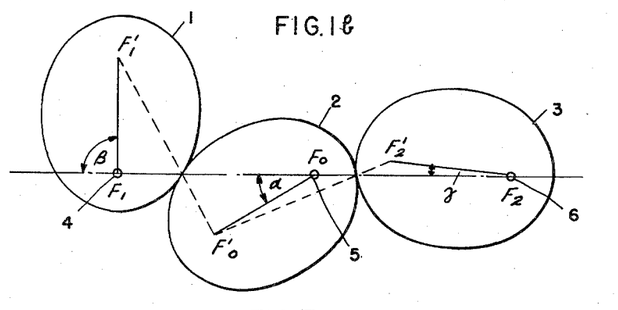
Figure 1(b) is a similar view showing the displacement of the gears as they rotate.

With reference to Figures 1(a) and 1(b), two positions of three identical elliptical gears 1, 2 and 3 are diagrammatically shown, being mounted respectively at 4, 5 and 6. Gear 2 is driven with a constant rotational and angular speed. As shown in Figure 1(b), gear 1 has its momentarily greatest rotational speed and gear 3 has its momentarily lowest rotational speed. When all three gears are rotated through 180° the speed relationships are reversed and gear 1 has the smallest momentary rotational speed whereas gear 2 has the highest. The angles of displacement are indicated in Figure 1(b) as $\alpha$ for gear 2, $\beta$ for gear 1 and $\gamma$ for gear 3. These positions may be described mathematically as follows:

If the points of mounting are referred to as $F_0$, $F_1$ and $F_2$, the large half axes are $a$ (Figure 1(a)) and the small half axes are $b$. The focal point distance of gear mid point $M_0$, $M_1$ or $M_2$ is then $c=\sqrt{a^2-b^2}$. The numerical eccentricity is $$\epsilon = \frac{c}{a}$$

If the central gear wheel is driven about $F_0$ with a constant rotational speed $n$ or an angular speed $\omega$, then the rotational speed $n_1$ and the angular speed $\omega_1$ of gear 1 about $F_1$ is variable according to the following equation:

$$\frac{n_2}{n} = \frac{\omega_2}{\omega} = \frac{1-\epsilon^2}{1-2\epsilon\cos\omega_t + \epsilon^2}$$

and the rotational speed $n_2$ and the angular speed $\omega_2$ of the gear 3 about $F_2$ varies according to the equation:

$$\frac{n_2}{n} = \frac{\omega_2}{\omega} = \frac{1-\epsilon^2}{1+2\epsilon\cos\omega_t + \epsilon^2}$$

In the formulae, $t$ represents the time in seconds and the dimension of $\omega$, $\omega_1$ and $\omega_2$ is 1/sec.

In the position of Figure 1(a), the gear 1 about $F_1$ has its momentarily greatest rotational speed, namely:

$$n_{1\,max} = \frac{1+\epsilon}{1-\epsilon} \cdot n$$

and the gear 3 about $F_2$ has its momentarily lowest rotational speed, namely:

$$n_{2\,min} = \frac{1-\epsilon}{1+\epsilon} \cdot n$$

When all three gears have turned through 180°, the speed relationships are reversed and the gear 1 about $F_1$ has the smallest momentary rotational speed and gear 3 about $F_2$ has the highest.

Figure 2A:
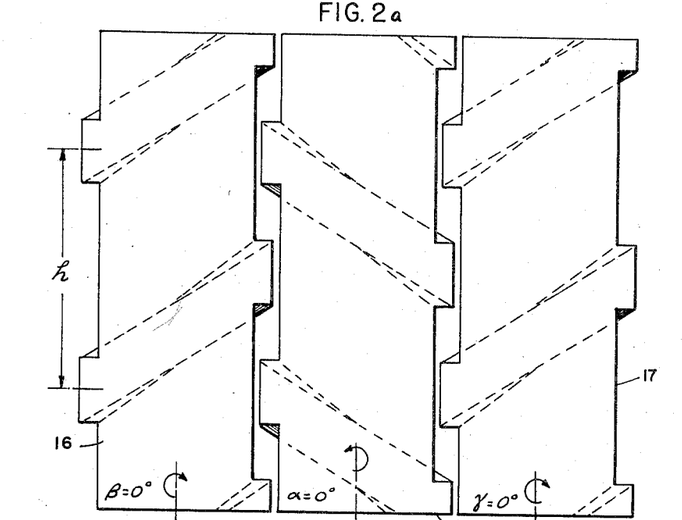
Figure 2(a) is a schematic illustration of a triple endless screw system in an initial position.
Figure 2B:
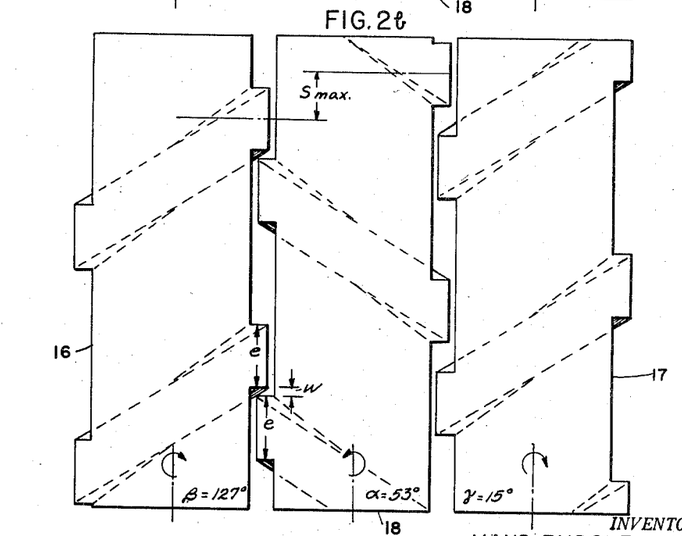
Figure 2(b) is a schematic illustration showing the displacement of the screws of Figure 2(a) with respect to each other at a given position.

Figures 2(a) and 2(b) show respectively two positions of an oppositely running triple endless screw employing an elliptical gear system described above as embodied in Figure 1(a). Screws 16 and 17, arranged directly on the parallel axes 4 and 6 ($F_1$ and $F_2$) of the elliptical gears 1 and 3 (Figures 1(a) and (b)) rotate in the same direction. Screw 18, mounted on the axis 5 ($F_0$) of gear 2, consequently has a constant speed of rotation corresponding to the speed of gear 2, and rotates in a direction opposite to that of screws 16 and 17. A mean position of the screws in shown in Figure 2(a) wherein the driving angle of the thread of each screw is always at an angle of 0°, 180°, 360° and so on. The greatest calculated relative displacement of the screws about rotational points 4 and 6 occurs as shown in Figure 2(b). As shown $\beta$ is 127°, $\alpha$ 53° and $\gamma$ 15°.

The maximum displacement may be expressed mathematically as follows:

The initial position with the time $t=0$ is shown in tional points 4 and 6 occurs as shown in Figure 2(b). As is obtained each time the driving angle $\alpha=0°$, 180°, 360° and so on. The greatest calculated relative displacement of the endless screws about $F_1$ or $F_2$ (the points of mounting of the gears and the screws) with respect to the endless screw about mounting position F° occurs in the limiting position when:

$$\epsilon = \cos(\pm \omega_t), \text{ or } \epsilon = -\cos(\pm \omega_t)$$

or $$\omega = \omega_1, \text{ or } \omega = \omega_2$$

Figure 2(b) shows for example the limiting position for $\epsilon = 0.6$; this is attained each time that $\alpha = 53°, 127°, 307°$ and so on.

If the pitch of all three endless screws is equal to $h$, as indicated in Figure 2(a), then, calculated from the initial or mean position, the greatest relative displacement of the thread of the endless screws about $F_1$ and $F_2$ with respect to the endless screw about $F_0$ is:

$$s_{max} = \pm \frac{h}{\pi} \cdot \text{arc sin } \epsilon$$

With a given minimum gap width $w$ (see Figure 2(b)), the web width $e$, for example of a rectangularly cut triple endless screw with elliptical drive, can be calculated according to the following formula:

$$e + w = \frac{h}{\pi} \cdot \text{arc cos } \epsilon$$

Figure 3A:
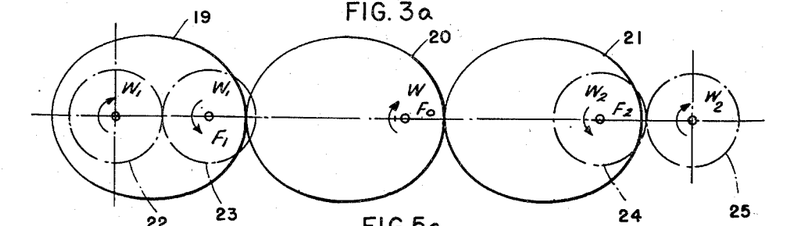
Figure 3(a) is a diagrammatic illustration of three elliptical gears with auxiliary gears depicting an arrangement that may be used for changing the direction of rotation of the screws.
Figure 3B:
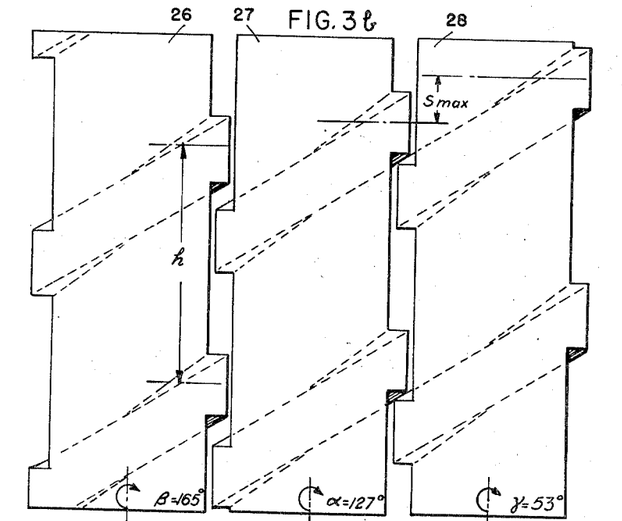
Figure 3(b) is a schematic illustration of a triple endless screw system outlining the directional movement imparted to the screws by the arrangement of the elliptical gears depicted in Figure 3(a)

In the arrangement shown in Figures 2(a) and 2(b) the endless screws are arranged directly on the parallel axes 4, 5 and 6 of the elliptical gears 1, 2 and 3. By using additional gears as portrayed in Figure 3(a) and changing the points of screw mounting, the endless screws can be caused to rotate in the same direction, as shown in Figure 3(b). In this system, elliptical gears 19, 20 and 21 are mounted respectively as in previous examples at points $F_1$, $F_0$ and $F_2$. Associated with elliptical gear 19, however, are auxiliary gears 22 and 23 and associated with elliptical gear 21 are auxiliary gears 24 and 25. Gear 20 is power driven transmitting a rotational direction opposite to its direction to gear 19 or 23 depending upon its path of rotation. The latter drives gear 22 in the same direction as gear 20. Endless screw 26 is mounted to the same axis of rotation as gear 22 and screw 27 is affixed axially at point $F_0$ about which gear 20 rotates.

Similarly, associated with gear 21 are auxiliary gears 24 and 25, screw 28 assuming the same axis of rotation as gear 25.

Thus it can be seen that all three screws rotate in the same direction. The variant speed of the elliptical gears is transmitted to the auxiliary gears which in turn is transmitted to the screws associated with the auxiliary gears and consequently the variant speed characteristic of the invention remains present. The rotational speed ratios, the relative displacements and the mean and limiting positions are the same in this instance as an oppositely running triple endless screw system and the same mathematical formulae apply.

EXAMPLE II

Double endless screw

A double endless screw system can be had by omitting either gear 1 or 3 shown in Figures 1(a) and 1(b). In this instance the endless screws will run in opposite directions but the same relationships apply as applied in a triple endless screw system. The mean positions correspond to the angles 0°, 180°, 360° and so on and the limiting positions are as indicated in previous examples.

Figure 4A:
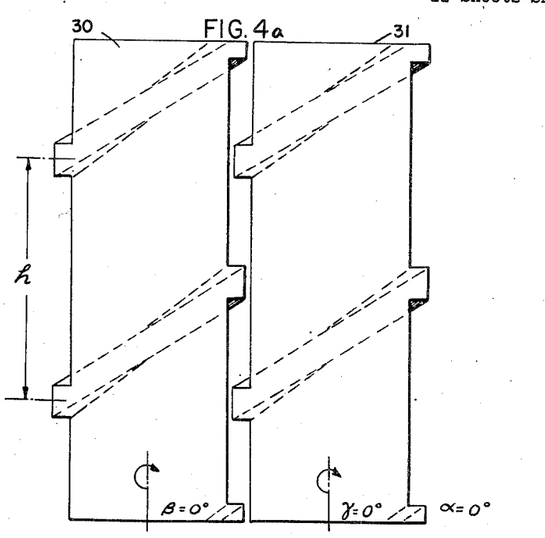
Figure 4(a) is a schematic illustration of a double endless screw system in one position.
Figure 4B:
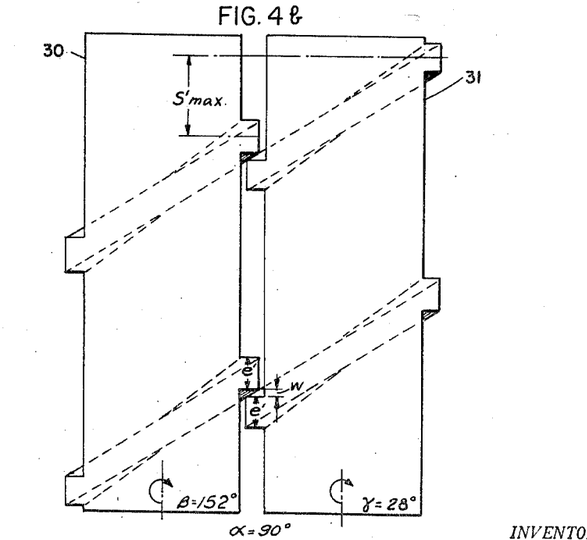
Figure 4(b) is a schematic illustration of the same system depicted in Figure 4(a) wherein the screws are at another position.

A double endless screw system running in the same direction can be obtained as in the case of a triple endless screw system by coupling the power-driven endless screw with one of the two outer endless screws comparable either to screws 16 or 17 in Figure 2(a) with additional gearing. This is done by omitting the central endless screw associated with gear 2, shown in Figure 1, but retaining that gear, and merely coupling two outer endless screws comparable to screws 16 and 17. Consequently two such screws as 30 and 31 of Figure 4(a) run in the same rotational direction. The mean position of these screws is shown in Figure 4(a), whereas the position of greatest displacement is shown in Figure 4(b).

In a double endless screw system the greatest relative displacement, i. e. the limiting positions, is set up independently of $\epsilon$ when the elliptical gear about $F_0$ has rotated 90° or 270°. The greatest calculated relative displacement (limiting position Figure 4(b)) from the initial position ($t=0$), i. e. the mean position, is then:

$$s_{max} = \pm \frac{h}{\pi} \cdot \text{arc cos } \frac{1-\epsilon^2}{1+\epsilon^2}$$

With a given minimum gap width $w$ the web width $e'$ of, for example, a rectangularly cut double endless screw with triple elliptical drive, can be calculated according to the following formula:

$$e' + w = \frac{h}{\pi} \cdot \text{arc sin } \frac{1-\epsilon^2}{1+\epsilon^2}$$

Figure 5A:
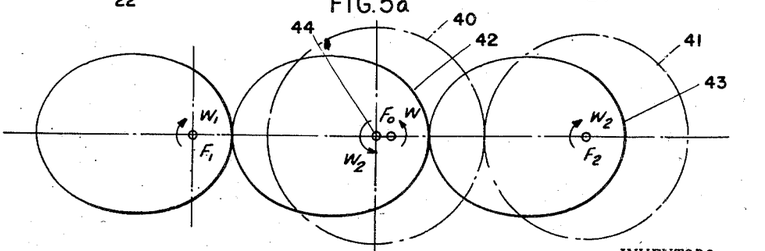
Figure 5(a) is a diagrammatic illustration of three elliptical gears shown in juxtaposition with respect to a double endless screw system.
Figure 5B:
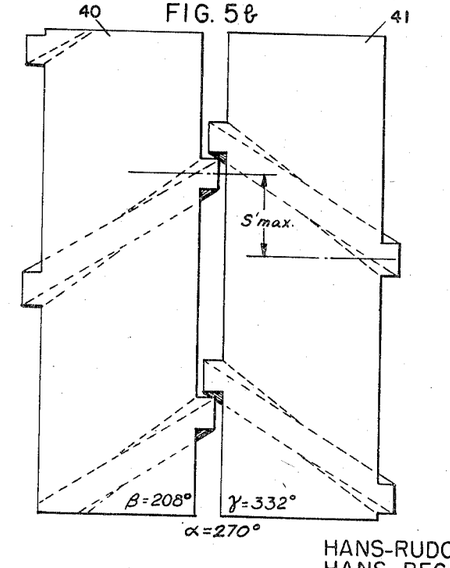
Figure 5(b) is a schematic illustration of the screws associated with the gears shown in Figure 5(a)

Through the use of an additional gear wheel transmission 40 and 41 as shown in Figures 5(a) and 5(b), two endless screws 42 and 43 on parallel axes can be arranged to turn in opposite directions. Such auxiliary gearing is necessary in order to permit the elliptical gears to follow its elliptic orbit upon its axis $F_0$. The axis of screw 40 is indicated at 44.

The examples discussed are based on the following numerical relationships: numerical eccentricity of the ellipse $\epsilon = 0.6$ and pitch of the endless screw $h = 60$ millimetres.

In each instance it also has been assumed that the initial position when time $t$ is equal to 0 that all endless screws occupy their mean position and the large axes of the elliptical gears lie on one line, the connecting line $M_1$, $F_1$, $M_0$, $F_0$, $M_2$, $F_2$, but this limitation is not absolute.

EXAMPLE III

Single endless screw

Figure 6:
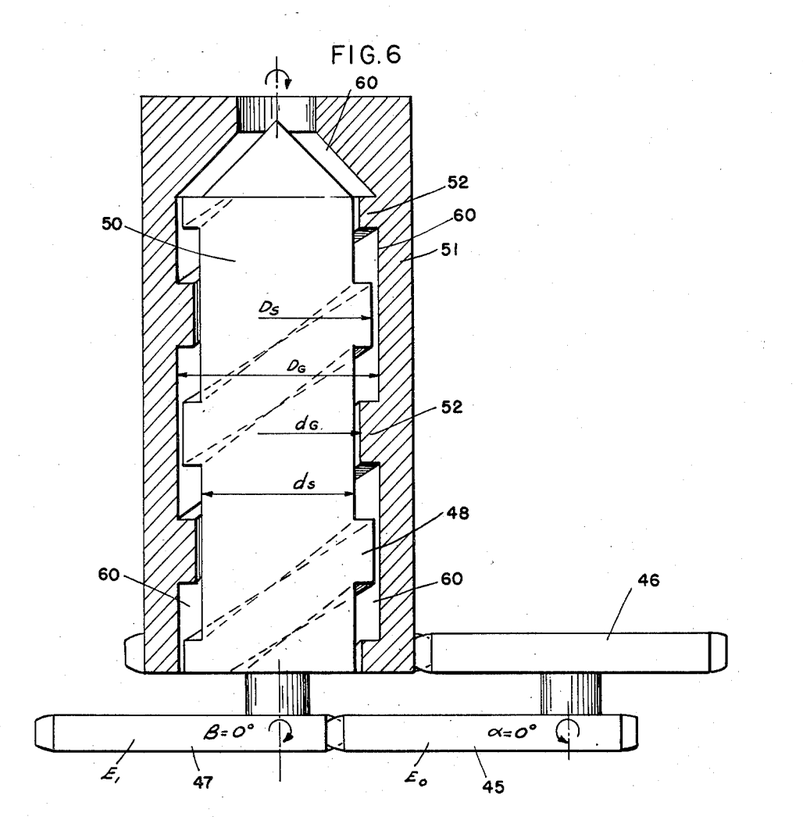
Figure 6 is a schematic plan view partly in section of an endless screw associated with a rotatable housing and a driving mechanism in an initial position.

This system embodies an endless screw machine with but a single endless screw having a relative longitudinal movement with respect to its housing and an elliptical gear system (numeral eccentricity=0.6). With respect to Figures 6 and 7 the system may be described as being comprised of an endless screw 50, a housing 51 having an internal thread 52 which corresponds in profile and mean pitch $h$ (Figure 7) to the profile and mean pitch of the endless screw. Elliptical gear 45 operating through a circular intermediate gear 46 drives the housing 51. Elliptical gear 47 drives the endless screw 50. Figure 6 embodies the system at an initial or mean position which is attained each time the driving angle ($\alpha$ and $\beta$) is equal to 0°, 180°, 360° and so on.

Figure 7:
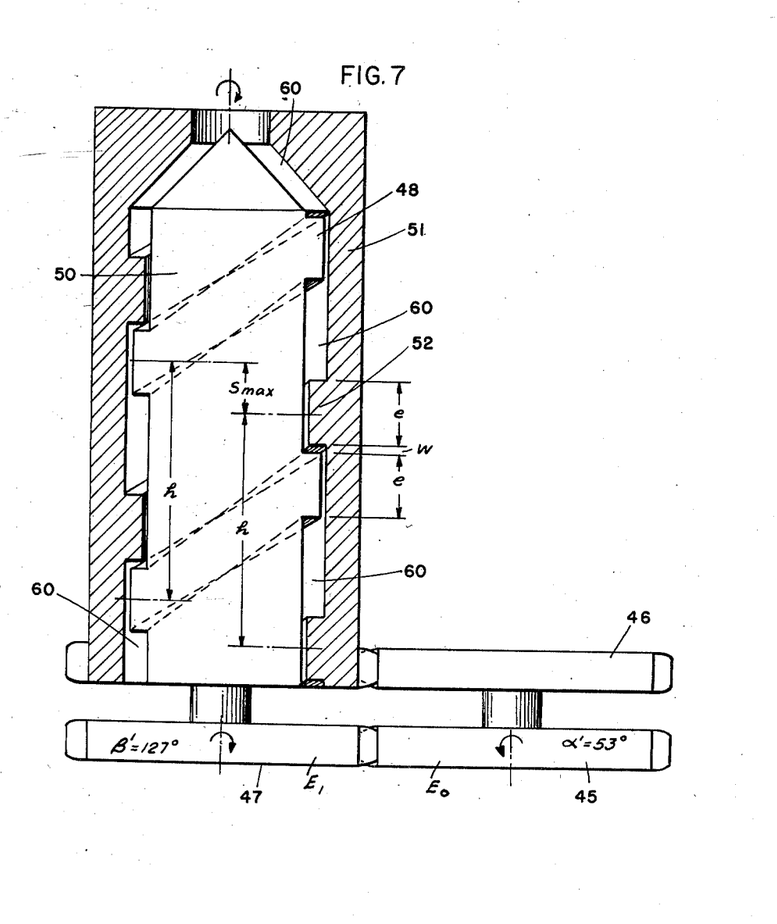
Figure 7 is similar to Figure 6 but shows the screw thread in another position.

Elliptical gear 45 is driven constantly thereby imparting periodic rotational speeds to gear 47 which movement in turn is carried to the screw 50. The screw thread 48 of endless screw 50 consequently reflects a periodic relative displacement with respect to the internal screw thread 52 of the housing 51 that rotates at a constant speed. The greatest calculated relative axial displacement from the mean position of the endless screw thread 48 with respect to the housing occurs in the limiting position at which the momentary rotational speed of the housing is equal to the momentary rotational speed of the screw. This limiting position is reached each time the driving angle is equal to 53°, 307° and so on as indicated in Figure 7. The numeric eccentricity of the elliptical gears is not limited to 0.6, but can lie between 0 and 1. The most efficient values, however, are those reflecting an eccentricity value lying between 0.2 and 0.8.

The maximum relative displacement, the profile or web width indicated at $e$ and the gap width $w$, are calculated according to the same formulae as given above in the above-described disclosures concerning multiple endless screw systems.

Dependent upon the numerical eccentricity of the gears chosen, the web width and the gap width may lie anywhere between $w=0$ and $e=e$ max, or $e=0$ and $w=e$ max. The eccentricity value of elliptical gears that are used and the web width and gap width of the endless screw depends on the amount of material that is to be conveyed between the endless screw thread and/or the extent to which the conveyed material is to be kneaded. The amount of material that is to be handled by the thread in a given period of time and the effective kneading action of the thread will also be influenced by the size of the varying spaces 60 (dimensions $Ds$, $Dg$, $dG$ in Figure 6) between the screw shaft, the screw thread and the housing. It is preferable to choose the spacing and the web and gap width so as to obtain optimum kneading action with the maximum output.

Kneading action can also be varied by varying the mean pitch (dimension $h$ of Figure 7). In the discussion heretofore it has been assumed that the pitch has been constant over the whole length of the endless screw. However, the pitch can be progressively increased or decreased from thread to thread in the direction of conveyance. For instance, the core diameter $ds$ of the endless screw 60 and the maximum internal diameter $Dg$ of the housing 60 may be arbitrarily fixed as an invariable over the whole length of the endless screw housing. However, if desired these diameters may be increased or decreased in longitudinal direction without altering the rhythmic relative displacement between the endless screw and the housing.

Furthermore, if desired, the web of the endless screw and/or housing may be bored to provide a single or common longitudinal opening. In lieu of such openings, if desired, straight or spiral grooves cut in a longitudinal direction in order to facilitate the passage of material and homogenization of the material may be effected.

The profiles of the endless screw and housing may have any cross sectional shape as, for example, rectangular, but they are preferably cut triangularly, trapezoidally or semi-circularly. Such cross sections are chosen when substances are difficult to knead. The endless screw and the housing may be heated or cooled depending upon the material that is to be worked.

As can be readily seen from Figures 6 and 7 it is possible to drive the endless screw at a constant speed instead of the housing. The period speed variation will then be imparted to the housing through elliptical gears 45 and 47 instead of to the endless screw. The angles alpha and beta should then be interchanged.

Figure 8:
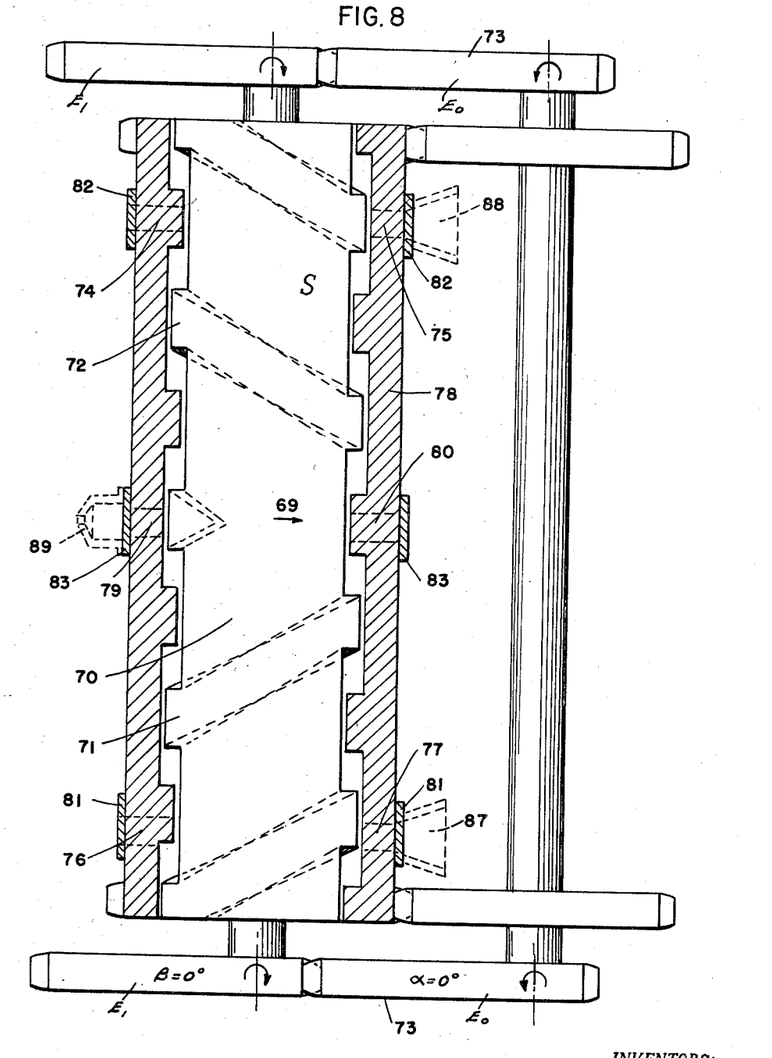
Figure 8 is a plan view partly in section of a single endless screw at an initial position having left-hand threads at one end and right-hand threads at another as associated with a housing, and a driving mechanism located at either end of the screw.
Figure 9:
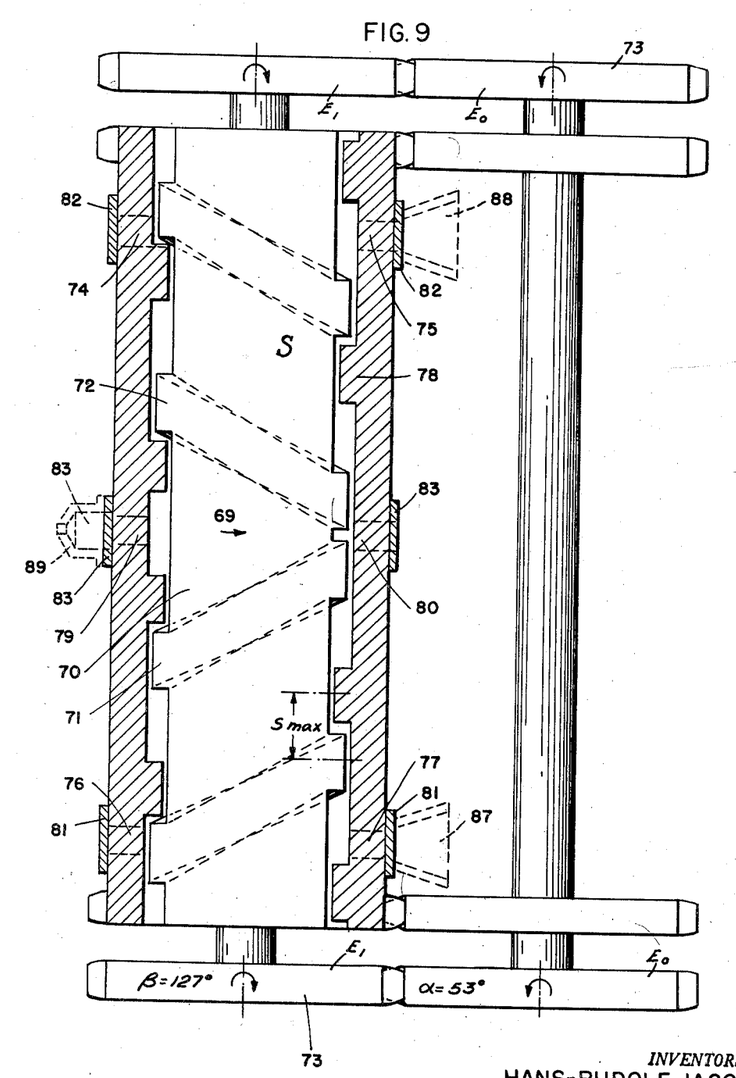
Figure 9 is a schematic plan view of the single screw depicted in Figure 8 but showing the screw threads at a different position.

Figures 8 and 9 embody forms of multiple endless screw machines permitting the use of high axial pressures such as might be desirable in the case of an endless screw spraying machine. In this form of the invention the endless screws are associated with bearings located at both ends of the screw. Material conveyed by and passing over the endless screws are sometimes thermoplasticized and it is necessary to effect an arrangement whereby a material does not encounter the bearings. The conveyed material is fed to the screw cylinder at both ends of the endless screw. The screw, of necessity, is cut as a right-hand screw at one end and as a left-hand screw at the other. The material charged in at both ends is then conveyed to the middle of the screw housing and expelled therefrom by a common opening or nozzle. The threads of such a machine carry out the oppositely directed relative movements in the axial direction with respect to the rotating housing. The latter is also provided with right-hand and left-hand threads, reciprocal to the threads of the screw with which it is associated.

This modification is shown in Figures 8 and 9 wherein single endless screw 70 has right-hand threads 71 and left-hand threads 72 that rotate in accordance with the directional movement described previously. The variant movement directs material fed at either end of the rotating housing 78 toward the middle of the screw where the threads meet, as indicated at 69 or away from the middle, depending upon the rotation direction. The elliptical gear arrangement can be a single drive or as shown at 73, a double drive wherein both ends of the endless screw and housing are coupled to a bearing and gear arrangement. Figure 9 shows the position of maximum relative displacement (elliptical numerical eccentricity of 0.6).

As shown in Figures 8 and 9, the material to be conveyed is introduced through openings 74, 75, 76 and 77, being bores or slots in the circumference of the housing 78. The material is extruded through center openings 79 and 80 of the housing. Circumscribing the housing 78 are stationary bands 81, 82, and 83, disposed at either end and the middle of the housing and over the end and center openings. Associated with the bands may be funnels such as indicated at 87 and 88. The bands are sealed against the housing to facilitate material loading. The openings 79 and 80 at the center of the housing, designed for unloading may be a channel or a nozzle as at 89. Funnels 87 and 88 are used for the introduction of material that is fed continuously in predetermined amounts to the endless screw through the respective openings 75 and 77 with which the funnels are associated. The material is conveyed from the screw ends into the central area 69 and from thence through openings 79 and 80 into contact with whatever distribution fixture may be used such as the nozzle 89. There is a tendency for material conveyed in this method to press into opening 80, more so than opening 79. Accordingly, band 84 constitutes a channel leading into the nozzle 89. The channel, of necessity, must be constructed so that the material is continuously forced in movement in the direction of opening 79. This choice of channel construction is reflected in the nozzle opening 79 and nozzle 89.

In the arrangement shown in Figures 13 and 14 the axial pressures of the endless screw and the housing counteract each other.

The same conveying principle can be employed in multiple endless screws. The threads of each end of the endless screws then undergo oppositely directed relative movements in the axial direction as in the case of the screw system just described. The relative displacement occurs with respect to adjacent endless screws. Such a modification of the invention is shown in Figures 10, 11 and 12, embodying a triple endless screw system.

In machines embodying systems of this variety each endless screw is provided with a right-hand thread and a left-hand thread. Referring to Figures 10 and 11, center screw 90 is driven at a constant speed and the two outer screws 91 and 92 are driven at a periodically varying speed as above described. The two screws 91 and 92 consequently undergo periodic relative movements with respect to the central screw. Again the relative movements of the two ends of each screw are opposite, towards or away from the middle. Figure 10 represents a mean position of this system and Figure 11 represents the maximum relative displacement for an ellipse drive embodying a specified or predetermined numerical eccentricity with a numerical eccentricity of 0.6.

The material that is to be conveyed or kneaded, such as a thermoplastic material, is introduced at either end of the machine as described with respect to the machine depicted in Figures 8 and 9. The material then passes through and along the screw threads within the housing and is extruded at the middle of the housing.

Figure 10:
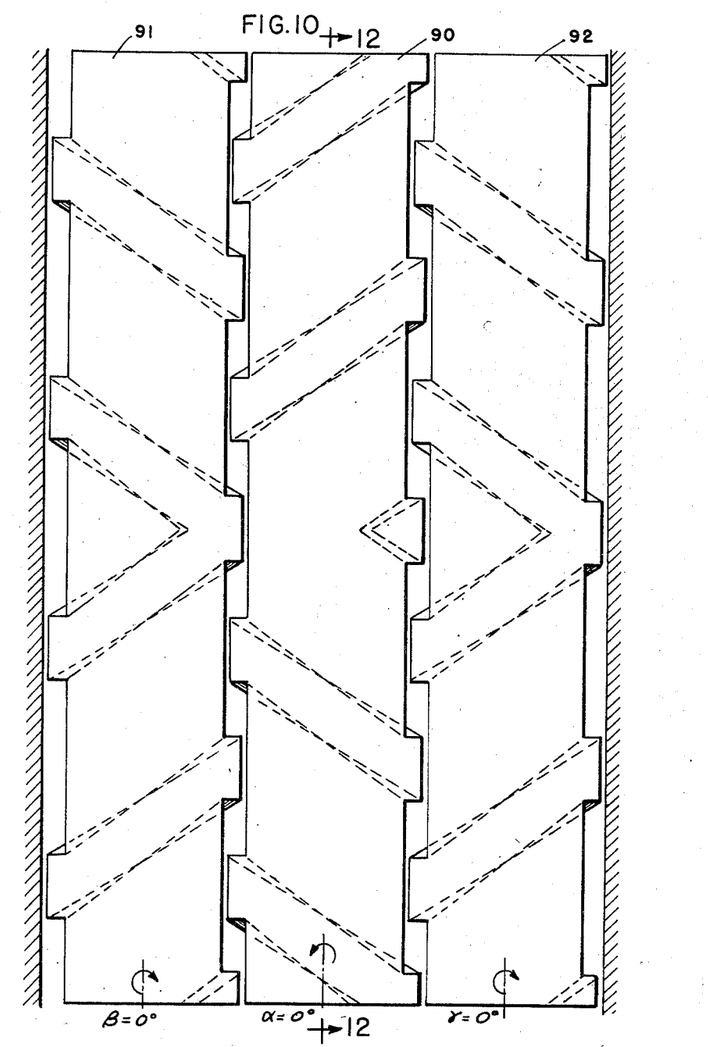
Figure 10 is a schematic illustration of a triple endless screw system at an initial position wherein each endless screw has left-hand threads and right-hand threads.
Figure 11:
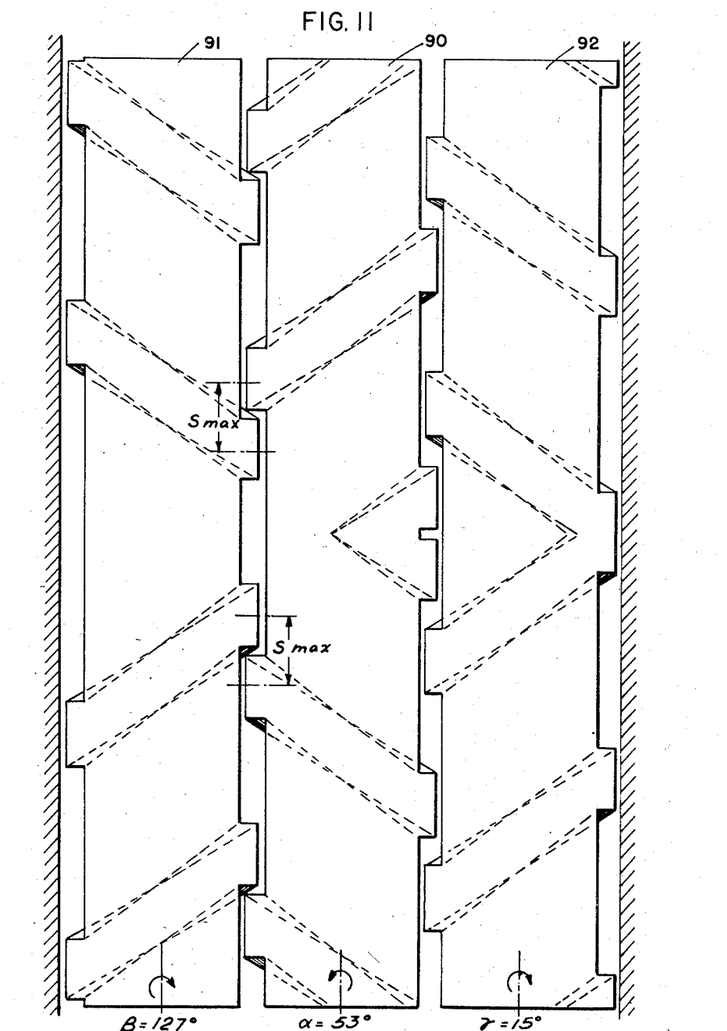
Figure 11 is another view of the screws shown in Figure 10 but depicting the threads in another position.
Figure 12:
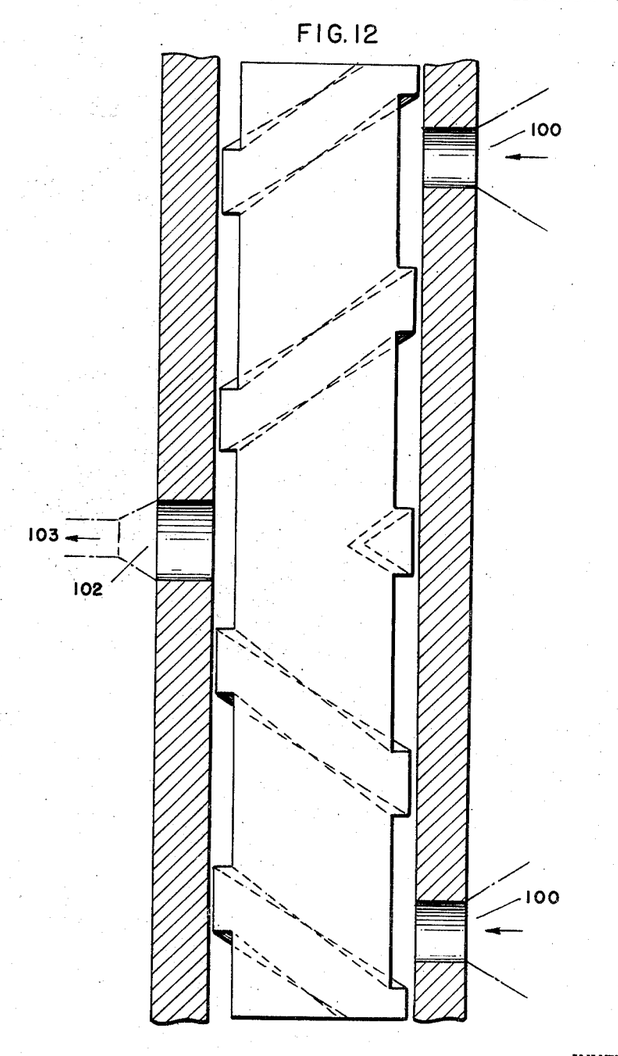
Figure 12 is a schematic plan view partly in section along line 12—12 of Figure 10 of an endless screw having left-hand and right-hand threads as associated with a housing having material input openings at either end of the housing and an output opening located centrally of the housing.

Figure 12 is a schematic plan view partly in section along the line 12—12 of Figure 10. As shown therein, material is received at inlets 100 and 101 and is extruded at outlets 102 and into nozzle 103 or whatever termination means that may be desired.

As can be seen the combinations of multiple screw thread systems in association with right-hand threads on one end of an endless screw and left-hand threads on the other, can be applied to any of the above-described arrangements embodied in multiple screw systems.

The series of multiple endless screw systems and machines employing same herein described may be advantageously employed for conveying and kneading of materials wherein the variant longitudinal displacement of the endless screws which in turn is imparted to the materials conveyed or kneaded. These functions will supply many needs. Since the discharge of the materials will reach a high point and an ebb, the systems will be of particular significance in mixing and compounding operations as well as general manufacturing operations, many of which may not have occurred to applicant.

We claim:

1. Endless conveyor mechanism for plastic materials comprising, a plurality of elongated threaded members each having a substantially constant diameter throughout its length, the threads of adjacent members engaging each other, means mounting said members for rotation, and drive means for rotating at least one of said members at a periodically varying rotational speed, whereby relative movement in an axial direction will take place between the interengaging threads at periodically varying speeds.

2. Endless conveyor mechanism for plastic materials comprising, a plurality of endless screws each having a substantially constant diameter and having the threads of adjacent screws engaging each other, means mounting said screws for rotation about substantially parallel axes, and drive means for rotating at least one of said screws at a periodically varying rotational speed, whereby relative movement in an axial direction will take place between the interengaging threads at periodically varying speeds.

3. Endless conveyor mechanism for plastic materials comprising, a plurality of elongated threaded members, the threads of adjacent members engaging each other, means mounting said members for rotation about substantially parallel axes, and drive means including intermeshing eccentrically mounted non-circular gears for rotating at least one of said members at a periodically varying rotational speed, whereby relative movement in an axial direction will take place between the interengaging threads at periodically varying speeds.

4. Endless conveyor mechanism for plastic materials comprising, a plurality of elongated threaded members, the threads of adjacent members engaging each other, means mounting said members for rotation about substantially parallel axes, and drive means including a rotating multiple crank drive coupled to said members for rotating at least one of said members at a periodically varying rotational speed, whereby relative movement in an axial direction will take place between the interengaging threads at periodically varying speeds.

5. Endless conveyor mechanism for plastic materials comprising, a plurality of endless screws having the threads of adjacent screws engaging each other, means mounting said screws for rotation about substantially parallel axes, drive means for rotating one of said screws at a substantially constant speed, and drive means for rotating one or more screws adjacent said one screw at a periodically varying rotational speed, whereby relative movement in an axial direction will take place between the interengaging threads at periodically varying speeds.

6. Endless conveyor mechanism for plastic materials comprising, an elongated housing member having internal threads therein, an endless screw member within said housing having the threads thereon engaging the threads of said housing, means mounting said housing and screw members for rotation, and drive means for rotating one of said members at a periodically varying rotational speed, whereby relative movement in an axial direction will take place between the interengaging threads at periodically varying speeds.

7. Endless conveyor mechanism as defined in claim 6, wherein said drive means rotates said housing at a periodically varying rotational speed, and rotates said screw at a constant speed.

8. Endless conveyor mechanism as defined in claim 6, wherein said drive means rotates said screw at a periodically varying rotational speed, and rotates said housing at a constant speed.

9. Endless conveyor mechanism for plastic materials comprising, an elongated housing member having internal right-hand threads at one end thereof and internal left-hand threads at the other end thereof, an endless screw member within said housing having right-hand threads at one end thereof and left-hand threads at the other end thereof, the threads on said screw and in said housing being in engagement with each other, means mounting said housing and screw members for rotation, and drive means for rotating one of said members at a periodically varying rotational speed, whereby relative movement in an axial direction will take place between the interengaging threads at periodically varying speeds.

10. Endless conveyor mechanism for plastic materials comprising a plurality of endless screws each having right-hand threads on one end thereof and left-hand threads on the other end thereof, the threads on adjacent screws being in engagement with each other, means mounting said screws for rotation about substantially parallel axes, and drive means for rotating at least one of said screws at a periodically varying rotational speed, whereby relative movement in an axial direction will take place between the interengaging threads at periodically varying speeds.

11. Endless conveyor mechanism for plastic materials comprising, a plurality of endless screws having the threads of adjacent screws engaging each other, means mounting said screws for rotation about substantially parallel axes, and drive means for rotating at least one of said screws at a periodically varying rotational speed, whereby relative displacement in an axial direction will take place between the interengaging threads at periodically varying speeds, the arrangement of the threads on said screws being such that the maximum periodic displacement of each thread of one endless screw in relation to the threads of the adjacent endless screws lies between zero and a half pitch of the thread on said one endless screw.

12. Endless conveyor mechanism for plastic materials comprising, an elongated housing member having internal threads therein, an endless screw member within said housing having the threads thereon engaging the threads of said housing, means mounting said housing and screw members for rotation about substantially parallel axes, and drive means for rotating one of said members at a periodically varying rotational speed, whereby relative displacement in an axial direction will take place between the interengaging threads at periodically varying speeds, the arrangement of the threads on said members being such that the maximum periodic displacement of each thread of one member in relation to the threads of the other member lies between zero and a half pitch of the thread on said one member.

13. Endless conveyor mechanism for plastic materials comprising, a housing, a plurality of endless screws within said housing each having right-hand threads on one end thereof and left-hand threads on the other end thereof, the threads on adjacent screws being in engagement with each other, means mounting said screws within said housing for rotation about substantially parallel axes, drive means for rotating at least one of said screws at a periodically varying rotational speed, whereby relative displacement in an axial direction will take place between the interengaging threads at periodically varying speeds, a charge opening at each end of said housing, and a discharge opening through said housing at substantially the center thereof.

14. Endless conveyor mechanism for plastic materials comprising, an elongated housing member having internal right-hand threads at one end thereof and internal left-hand threads at the other end thereof, an endless screw member within said housing having right-hand threads at one end thereof and left-hand threads at the other end thereof, the threads on said screw and in said housing being in engagement with each other, means mounting said housing and screw members for rotation, drive means for rotating one of said members at a periodically varying rotational speed, whereby relative displacement in an axial direction will take place between the interengaging threads at periodically varying speeds, a charge opening at each end of said housing, and a discharge opening through said housing at substantially the center thereof.

15. Endless conveyor mechanism for plastic materials comprising, a plurality of elongated threaded members, the threads of adjacent members engaging each other, means mounting said members for rotation about substantially parallel axes, and drive means for rotating at least one of said members at a periodically varying rotational speed, whereby relative movement in an axial direction will take place between the interengaging threads at periodically varying speeds, said drive means including intermeshing elliptical gears having an eccentricity between 0.2 and 0.8.

16. Endless conveyor mechanism for plastic materials comprising, a pair of endless screws having the threads thereof engaging each other, means mounting said screws for rotation about substantially parallel axes, and drive means for rotating one of said screws at a periodically varying rotational speed, whereby relative movement in an axial direction will take place between the interengaging threads at periodically varying speeds.

17. Endless conveyor mechanism for plastic materials comprising, a pair of elongated threaded members having the threads thereof engaging each other, means mounting said members for rotation about substantially parallel axes, and drive means including intermeshing eccentrically mounted non-circular gears for rotating one of said members at a periodically varying rotational speed, whereby relative movement in an axial direction will take place between the interengaging threads at periodically varying speeds.

References Cited in the file of this patent
UNITED STATES PATENTS

| | | |
|---|---|---|
| 844,210 | Strickland | Feb. 12, 1907 |
| 2,119,162 | Hartner | May 31, 1938 |
| 2,346,014 | Downey | Apr. 4, 1944 |
| 2,545,141 | Escher | Mar. 13, 1951 |
| 2,552,572 | Mikina | May 15, 1951 |
| 2,603,084 | Waddell | July 15, 1952 |
| 2,630,906 | Philipp | Mar. 10, 1953 |